(12) United States Patent
Kinoshita et al.

(10) Patent No.: US 6,797,316 B2
(45) Date of Patent: Sep. 28, 2004

(54) PROCESS FOR PRODUCING A COATING FILM AND PROCESS FOR PRODUCING A SOLID POLYMER ELECTROLYTE FUEL CELL

(75) Inventors: Shinji Kinoshita, Yokohama (JP); Hiroshi Shimoda, Yokohama (JP); Atsushi Mukoyama, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 211 days.

(21) Appl. No.: 10/253,865

(22) Filed: Sep. 25, 2002

(65) Prior Publication Data

US 2003/0082308 A1 May 1, 2003

(30) Foreign Application Priority Data

Sep. 26, 2001 (JP) ........................................ 2001-293337

(51) Int. Cl.[7] ................................................ B05D 5/12
(52) U.S. Cl. .................... 427/115; 427/358; 427/407.1; 427/402; 428/1.1; 429/30; 429/34
(58) Field of Search ................................ 427/402, 115, 427/358, 407.1; 428/1.1; 429/30, 34

(56) References Cited

U.S. PATENT DOCUMENTS 4,935,264 A * 6/1990 Tsujino et al. ............ 427/163.1
5,718,947 A * 2/1998 Martin et al. ................ 427/243

FOREIGN PATENT DOCUMENTS

EP          0 094 679         11/1983
EP          0094679 A2 *      11/1983
EP          0984083 A2 *       3/2000
EP          0 984 083          3/2000
EP          1298752 A1 *       4/2003
WO          WO 00/66351       11/2000
WO          WO-00/66351   *   11/2000

OTHER PUBLICATIONS

Patent Abstracts of Japan, JP 2001–035508, Feb. 9, 2001.

U.S. patent application Ser. No. 10/158,145, pending, filed May 31, 2002.

U.S. patent application Ser. No. 10/253,865, Kinoshita et al., filed Sep. 25, 2002.

U.S. patent application Ser. No. 10/157,917, Mukoyama et al., filed May 31, 2002.

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

A process for producing a coating film consisting of a single coating layer or a plurality of coating layers laminated, which comprises a coating operation of relatively moving at least one of a die for discharging a coating liquid containing short fibrous fillers from a linear opening with a predetermined length and a substrate for coating, on which the coating liquid discharged from the die is coated, to form a coating layer on the substrate for coating, wherein the direction in the coating operation includes at least two different angle directions with regard to the single coating layer or the plurality of coating layers of the coating film.

24 Claims, 8 Drawing Sheets

PROCESS FOR PRODUCING A COATING FILM AND PROCESS FOR PRODUCING A SOLID POLYMER ELECTROLYTE FUEL CELL

The present invention relates to a process for producing a coating film, a coating film produced by said process and a solid polymer electrolyte fuel cell having said coating film as an electrolyte membrane. Particularly, it relates to a process for producing a coating film which makes it possible to make strength properties of the film containing a reinforcing material comprising short fibrous fillers isotropic, a coating film produced by said process and a process for producing an electrolyte membrane for solid polymer electrolyte fuel cells by said coating process.

Fuel cells are expected to be widely used in the future since their power generation efficiency is high, and their load to the environment is light. Particularly solid polymer fuel cells are expected to be widely spread for movable bodies such as automobiles, or as a diversed power generation system or a cogeneration system for home use, since their power density is high and their operating temperature is low, whereby downsizing and cost cutting are easy as compared with other fuel cells.

Figure 7:
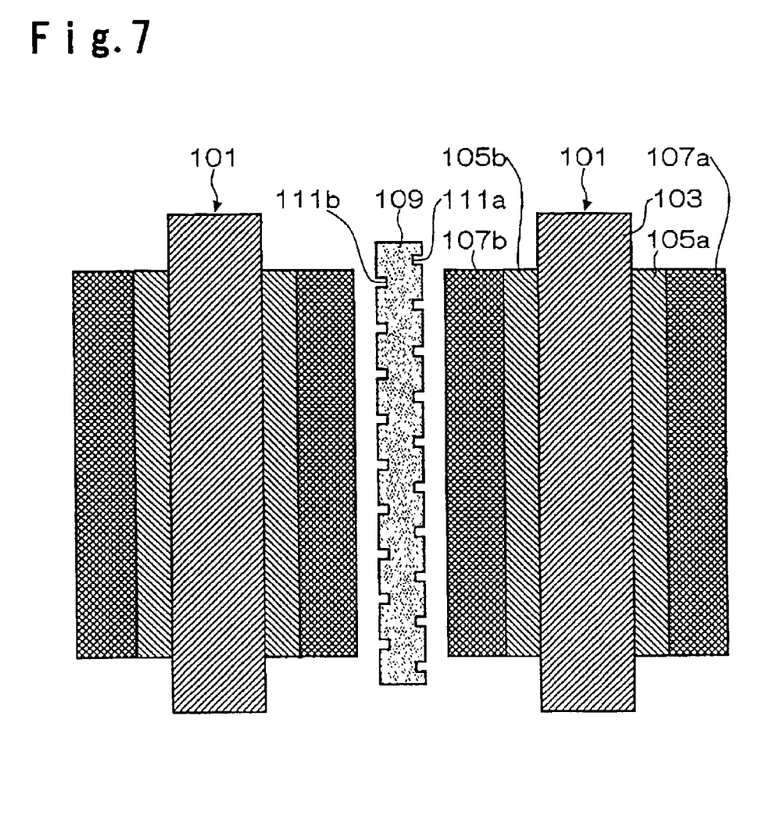
FIG. 7 is a sectional view illustrating the constitution of a solid polymer electrolyte fuel cell.

In general, as illustrated in the sectional view of FIG. 7, a membrane-electrode assembly 101 for solid polymer electrolyte fuel cells comprises a polymer electrolyte membrane 103 comprising an ion exchange resin, catalyst layers 105a and 105b bonded to both sides of the polymer electrolyte membrane 103, and e.g. carbon paper or carbon cloth as gas diffusion layers 107a and 107b disposed outside the catalyst layers.

Outside the gas diffusion layers 107a and 107b, an electrically conductive separator 109 is disposed. On the separator 109, gas flow paths 111a and 111b, which face the gas diffusion layers 107a and 107b, are formed. A fuel gas and an oxidant gas are made to pass through the gas flow paths, and at the same time, electricity is transmitted from the gas diffusion layers 107a and 107b to the outside, and electric energy is taken out.

As described above, the membrane-electrode assembly 101 is formed by bonding the electrode catalyst layers 105a and 105b containing a noble metal on both sides of the polymer electrolyte membrane 103. The electrode catalyst layers 105a and 105b are formed by a method of directly coating the polymer electrolyte membrane 103 with an ink for formation of an electrode catalyst layer, containing a catalyst-supported carbon and a dispersion of an ion exchange resin (such as a dispersion of a perfluorocarbon polymer having sulfonic acid groups) as the main solid contents or a method wherein catalyst layers 105a and 105b preliminarily formed in the form of a sheet are bonded to the polymer electrolyte membrane 103 by means of e.g. hot pressing.

In addition, a method of coating each of the coating layers 105a and 105b formed into a sheet with an ion exchange resin dispersion by cast film forming, laminating and bonding and the catalyst layers 105a and 105b with the coating films faced inside, may, for example, be mentioned.

In order to improve performances of the fuel cell, it is considered to decrease the electric resistance by making the polymer electrolyte membrane 103 thin. In a case where a polymer electrolyte membrane 103 in the form of a thin film is formed by cast film forming by using an ion exchange resin comprising a fluorine-containing polymer having sulfonic acid groups, a method of mixing short fibrous fillers with the ion exchange resin with a purpose of compensating for the decrease in mechanical strength, is considered.

Figure 8:
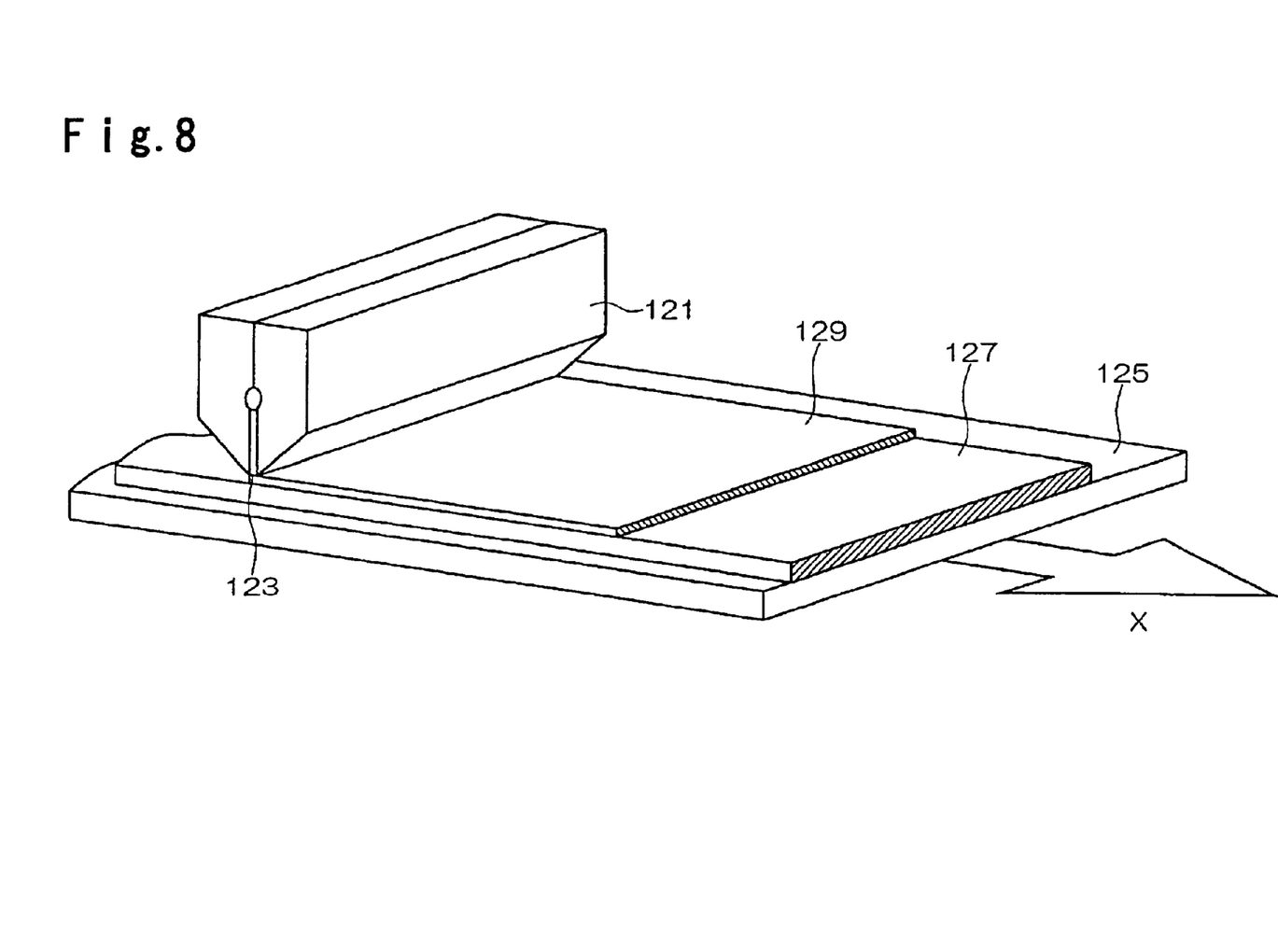
FIG. 8 is a perspective view illustrating a conventional cast film forming.

In a conventional cast film forming, as illustrated in a perspective view of FIG. 8, a die 121 for discharging a coating liquid is equipped with a linear opening 123 in the form of a slit downward as an exit. A substrate 125 for coating disposed to face the linear opening 123 is relatively movable in at least one direction. For example, the substrate 125 for coating is movable in the longitudinal direction X for feeding operation.

The coating liquid discharged from the linear opening 123 of the die 121 is coated on the coating substrate 125 by a coating operation which relatively moves the die 121 in the longitudinal direction of the coating substrate 125. By this cast film forming, a coating film consisting of a single coating layer 127 or a coating film consisting of a plurality of coating layers wherein a second coating layer 129 is further formed on the coating layer 127 formed in advance.

However, in a case where an ion exchange resin containing short fibrous fillers is coated by the cast film forming, the short fibrous fillers are likely to be orientated in one direction at the exit of the die, and anisotropy is generated such that the strength is different as between in the MD direction (the direction in which a film is formed, the direction of the arrow X in FIG. 8) and in the TD direction (the direction perpendicular to the MD direction). Namely, the reinforcing effect by the short fibrous fillers is restricted to one direction, and no adequate strength can be obtained depending upon the direction in the film plane.

Under these circumstances, it is an object of the present invention to provide a process for producing a coating film, which makes it possible to make strength properties of a film containing a reinforcing material comprising short fibrous fillers isotropic, a coating film produced by said process, and a process for producing an electrolyte membrane for solid polymer electrolyte fuel cells by said coating process.

The present invention provides a process for producing a coating film consisting of a single coating layer or a plurality of coating layers laminated, which comprises a coating operation of relatively moving at least one of a die for discharging a coating liquid containing short fibrous fillers from a linear opening with a predetermined length and a substrate for coating, on which the coating liquid discharged from the die is coated, to form a coating layer on the substrate for coating, wherein the direction in the coating operation includes at least two different angle directions with regard to the single coating layer or the plurality of coating layers of the coating film.

The coating film is formed by a coating operation in at least two angle directions. Here, the short fibrous fillers in the coating liquid are aligned mainly along the direction of the coating operation. Accordingly, the short fibrous fillers in the single or the plurality of coating layers are aligned in at least two different directions depending upon the coating operation. Namely, with regard to a cross section in an optional direction, the short fibrous fillers are present so that the short fibrous fillers in at least one direction cross the cross section.

Therefore, the coating film according to the production process of the present invention is free from such a drawback that mechanical properties such as a tensile modulus of elasticity and a tear strength are high only in one direction, and anisotropy in strength properties of a coating film such that the film is made to have a high strength only in one direction by short fibrous fillers, as in a conventional cast film obtained by moving the substrate for coating relatively to the die only in one direction along one line, can be decreased.

Further, in the present invention, the coating operation is preferably a composite operation comprising a feeding operation in one direction along one line and a reciprocating operation in a direction at right angles to the line of the feeding operation.

By the reciprocating operation under the process of the feeding operation, operations in at least different angle directions are continuously carried out, whereby a continuous film can be formed with coating operations in at least two directions. Further, the coating film can be formed by a simple construction comprising drive mechanism for the feeding operation and drive mechanism for the reciprocating operation.

Further, in the present invention, it is preferred that the direction in the feeding operation is a direction at right angles to the longitudinal direction of the linear opening of the die, and the direction in the reciprocating operation is the longitudinal direction of the linear opening of the die.

By the reciprocating operation in the die width direction with the feeding operation in a direction at right angles to the die width direction i.e. the die front direction, a coating film in a single layer can be formed. Further, as the directions in the feeding operation and in the reciprocating operation are at right angles, the film thickness can easily be controlled by adjusting the operation speed in both directions or the flow amount of the coating liquid.

Further, in the present invention, it is preferred that the direction in the feeding operation is the longitudinal direction of the linear opening of the die, and the direction in the reciprocating operation is a direction at right angles to the longitudinal direction of the linear opening of the die.

By the feeding operation in the die width direction with the reciprocating operation in the direction at right angles to the longitudinal direction (width direction) of the linear opening, i.e. the die front direction, a coating film wherein part of the layer is superposed on the other in every reciprocating operation, is formed. The proportion of superposition in the coating film can be changed depending upon the feeding speed of the die to the side.

For example, by determining the feeding speed of the substrate for coating so that it moves a distance of the length of the die in one cycle of the reciprocating operation of the die, superposed portions wherein two layers are superposed one on the other are continuously formed adjacent to each other. As a result, a laminated film consisting of two coating layers at every portion can be obtained.

Further, in the present invention, it is preferred that the coating film has at least two coating layers, in any two coating layers, each of the directions in the coating operations for forming the upper side coating layer and the lower side coating layer is at right angles to the longitudinal direction of the linear opening of the die, and after formation of the lower side coating layer, the direction of at least one of the die and the substrate for coating is changed to form the upper side coating layer so that the directions of the coating operations for the lower side coating layer and the upper side coating layer are at right angles to each other.

The coating film obtained by the above process is a laminate comprising at least two coating layers, and containing two layers of which the directions of casting are at right angles, whereby isotropy in strength is improved. Further, coating of this coating film can easily be carried out by superposing a plurality of coating layers, without a complicated coating operation.

Further, in the present invention, the short fibrous fillers preferably comprise a fibrillated fluorocarbon polymer.

In the present invention, the short fibrous fillers are meant for fibers having an average length of less than 3 mm. In a case where a polymer is contained in the coating liquid as a matrix to form a film, preferred is one which may function as a reinforcing material in the obtained polymer film. The diameter of the short fibers is usually at a level of from 0.01 to 10 $\mu$m, and preferred are ones having a diameter at a level of from 0.05 to 5 $\mu$m and a length at a level of from 1 $\mu$m to 1 mm.

Specifically, glass fibers, silica fibers, quartz fibers, polymer fibers, metal fibers, ceramic fibers or carbon fibers may, for example, be mentioned. The polymer constituting the polymer fibers may, for example, be an aromatic polyamide, polybenzimidazole, polyparaphenylene benzobisoxasol, polypropylene, polytetrafluoroethylene (hereinafter referred to as PTFE), a tetrafluoroethylene-perfluoroalkyl vinyl ether copolymer or a fluorocarbon polymer such as polyvinylidene fluoride.

Particularly when the coating film obtained by the present invention is applied to e.g. fuel cells, preferred are fibers comprising a fluorocarbon polymer in view of improvement in elastic modulus while relatively securing durability and toughness.

Among them, fibrils comprising a fluorocarbon polymer are preferred. Specifically, preferred are fibrils of PTFE. The fibrils of PTFE may be obtained by imparting shear force to a powder of PTFE, and they can increase the tensile modulus of elasticity and tear strength even in a small content.

Further, the coating film obtained by the above process is preferably solidified or cured by reaction.

The coating film thus obtained is excellent in tear strength properties not only in one direction, but the anisotropy in strength of the coating film by the short fibrous fillers is decreased. Accordingly, a thin film with a small anisotropy can be formed by cast film forming.

The present invention further provides a process for producing an electrolyte membrane for solid polymer electrolyte fuel cells comprising a reinforced ion exchange membrane, wherein the ion exchange membrane is produced by the above-described process for producing a coating film, and the coating liquid contains short fibrous fillers and an ion exchange resin.

The present invention still further provides a process for producing a solid polymer electrolyte fuel cell comprising a polymer electrolyte membrane and an anode and a cathode facing each other with the polymer electrolyte membrane interposed therebetween, wherein the polymer electrolyte membrane is produced by the above-described process.

By blending short fibrous fillers comprising e.g. a fibrillated fluorocarbon polymer into the coating liquid containing an ion exchange resin, a thin film with small anisotropy can be formed by cast film forming using the coating liquid, and the obtained coating film has a low electric resistance. By disposing this film as a polymer electrolyte membrane, a solid polymer electrolyte fuel cell having high performances can be constituted.

Now, the present invention will be explained in detail with reference to the preferred embodiments.

Figure 1A:
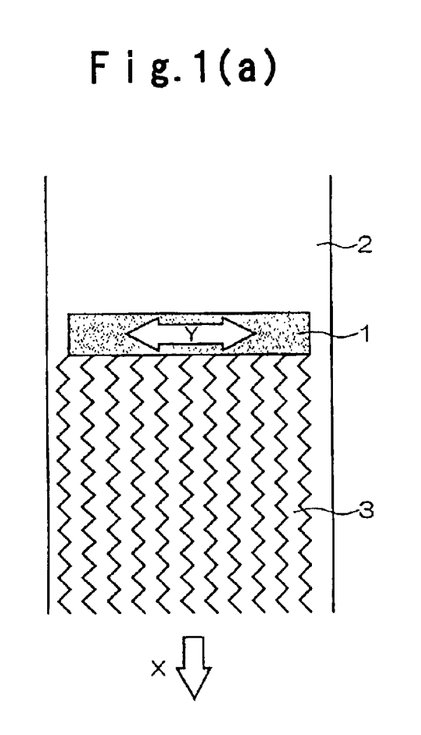
FIGS. 1(a) and 1(b) are coating process drawings illustrating the process for producing a coating film according to the first embodiment of the present invention.
Figure 1B:
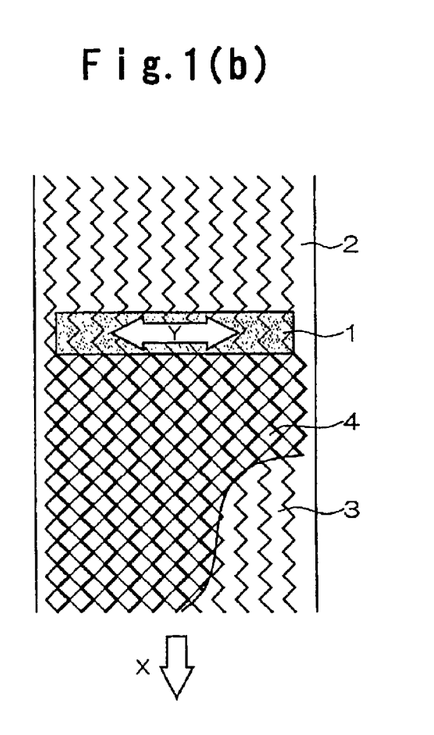

The process for producing a coating film according to the first embodiment of the present invention is shown in FIGS. 1(a) and 1(b).

In FIGS. 1(a) and 1(b), a die 1 reciprocates in the longitudinal direction Y of a linear opening (the die width direction) while discharging a coating liquid having short fibrous fillers blended therewith from the linear opening (not shown) at the bottom of the die 1. A substrate 2 for coating moves in the direction X at right angles to the longitudinal direction of the linear opening of the die (the die front direction).

The die 1 and the substrate 2 for coating are compositely operated simultaneously to form a first layer 3 in FIG. 1(a). Before the first layer 3 is solidified or after it is solidified, a coating layer as a second layer 4 is coated on the first layer 3 in the same manner as in the formation of the first layer 3, as shown in FIG. 1(b). Then, the substrate 2 for coating is separated to form a coating film consisting of a plurality of coating layers including the first layer 3 and the second layer 4.

The die 1 reciprocates at a certain amplitude, and the speed ratio between the die 1 and the substrate 2 for coating is made constant. The second layer 4 is coated under the same condition as in the coating of the first layer 3 except that the die 1 is reciprocated with timing opposite to that for the first layer 3.

By coating in such a manner, the trails of the coating operations to form the first layer 3 and the second layer 4 are broken line waveforms which bend in a zigzag at right angles with constant amplitude and cycle. Further, the trails of the coating operations for the first coating layer 3 and the second coating layer 4 are reverse to each other with respect to the feeding direction line, and the directions in the coating operations for the first layer 3 and the second layer 4 are at right angles to each other at any optional position except for the flexion apexes of the broken lines.

Then, the effect of the coating film thus formed will be explained.

As the trail of the coating operation to form the first layer 3 is along the broken line waveform having two directions which cross at right angles, the trail of the coating operation in at least one direction crosses the cross section in an optional direction at a great angle. Namely, the short fibrous fillers in the coating layer aligned mainly along the direction in the coating operation necessarily cross the optional cross section in the coating layer 3 at a great angle.

Accordingly, the reinforcing effect by the short fibrous fillers is given to an optional direction in the first layer 3, whereby the difference in strength depending upon the direction is decreased. The same applies to the second layer 4.

Further, as the first layer 3 and the second layer 4 are superposed one on the other so that the broken lines in the coating operations for the respective coating layers are reverse to each other, there are at least two coating operations at right angles in the thickness direction of the coating film basically. Namely, the short fibrous fillers cross one another at right angles in the thickness direction of the coating film.

The short fibrous fillers in two directions act so as to compensate for strength properties depending upon the direction, and accordingly the reinforcing effect by the short fibrous fillers is given to an optional direction of the coating film. Accordingly, in the thickness direction of the coating film wherein coating layers are laminated, the difference in strength depending upon the direction of the coating film by cast film forming is decreased, in the same manner as mentioned above.

As mentioned above, by controlling the orientation direction of the short fibrous fillers by means of the control of the coating operation, in the coating film by cast film forming, the difference in strength due to the direction in each coating layer and each of a plurality of laminated coating layers is decreased, and thus isotropic strength properties nearly uniform in all directions may be obtained. Here, in the case of this process, at both edges wherein the direction in the coating operation is in parallel with the direction X of the coating film, the film tends to be thin or the reinforcing effect tends to be weak as compared with the center portion, and accordingly it is preferred to cut the both edges as the case requires. The same applies to the other embodiments if the same phenomenon takes place.

Figure 2A:
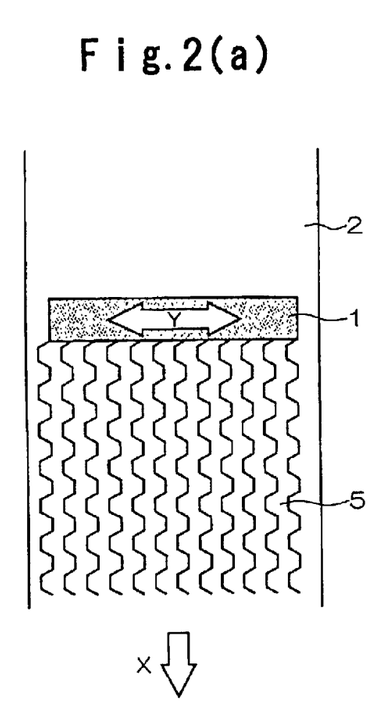
FIGS. 2(a) and 2(b) are coating process drawings illustrating the process for producing a coating film according to the second embodiment of the present invention.
Figure 2B:
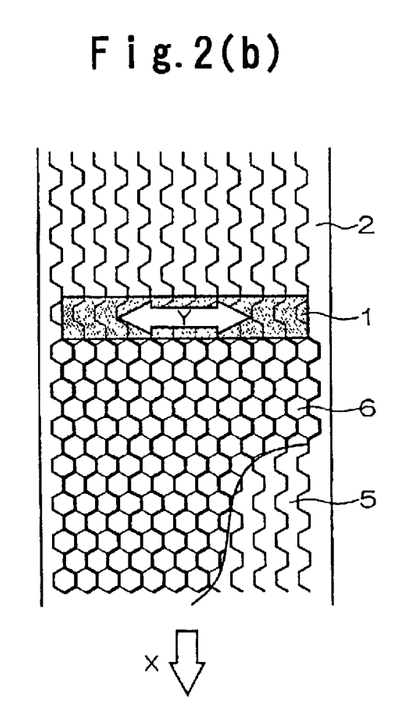

Now, the coating step of the process for producing a coating film according to the second embodiment of the present invention is shown in FIGS. 2(a) and 2(b).

FIGS. 2(a) and 2(b) illustrate an example wherein the trail of the coating operation is along the trapezoidal wave by interposing a pose in the reciprocating operation of the die 1.

By this coating operation in the trapezoidal waveform, a first layer 5 is coated, and then a second layer 6 is coated on the first layer 5 with an opposite timing of the reciprocating operation of the die 1 so that the trails of the coating operations for the first and second layers are along trapezoidal waves reverse to each other.

By the coating operation in a trapezoidal waveform, the trail of the coating operation in at least one direction crosses the cross section of the coating film in an optional direction with regard to each of the first layer 5 and the second layer 6. Accordingly, by the coating operation in a trapezoidal waveform, with the coating operations for the first and the second layers which are reverse to each other, isotropic strength properties nearly uniform in all directions may be obtained. Here, the film thickness can be controlled by adjusting the flow amount of the coating liquid.

Figure 3A:
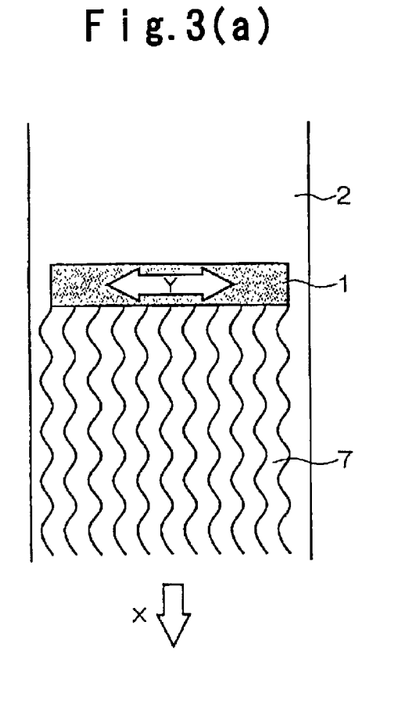
FIGS. 3(a) and 3(b) are coating process drawings illustrating the process for producing a coating film according to the third embodiment of the present invention.
Figure 3B:
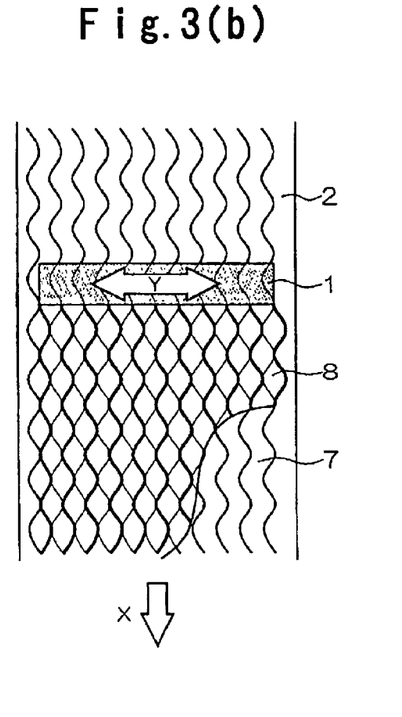

Now, the coating step of the process for producing a coating film according to the third embodiment of the present invention is shown in FIGS. 3(a) and 3(b).

FIGS. 3(a) and 3(b) illustrate an example wherein the trail of the coating operation is along the sine wave by reciprocating the die 1 by a simple harmonic motion.

A first layer 7 is coated by this coating operation in the sine waveform, and then a second layer 8 is coated with an opposite timing of the reciprocating operation of the die 1, whereby the first layer 7 and second layer 8 are superposed one on the other so that the trails of the coating operations therefor are along since wave reverse to each other.

By the coating operation in the sine waveform, the waveform may be selected so that the trail of the coating operation crosses the cross section of the coating film in an optional direction at a great angle with respect to each of the first layer 7 and the second layer 8. Accordingly, by such a coating operation in a sine waveform, with the coating operations for the first layer 7 and the second layer 8 reverse to each other, isotropic strength properties nearly uniform in all directions may be obtained.

Figure 4A:
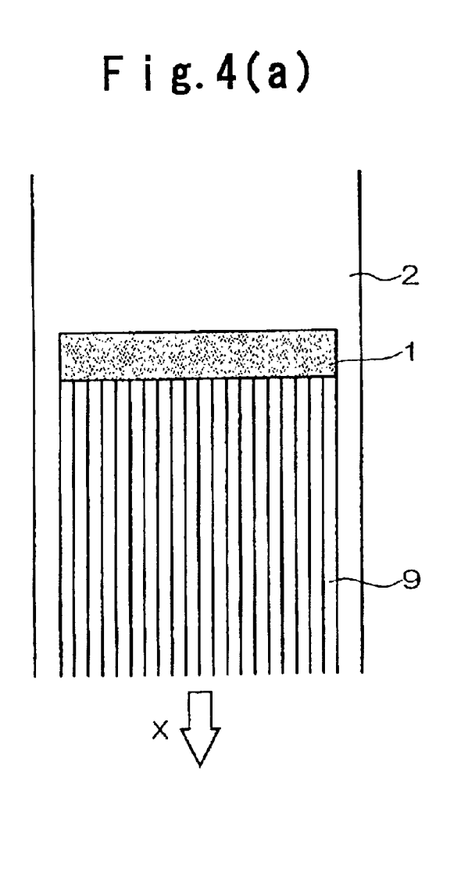
FIGS. 4(a) to 4(c) are coating process drawings illustrating the process for producing a coating film according to the fourth embodiment of the present invention.
Figure 4B:
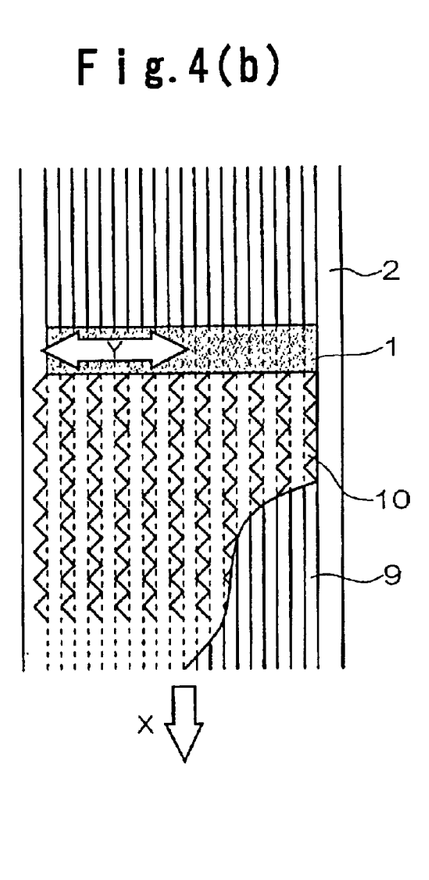
Figure 4C:
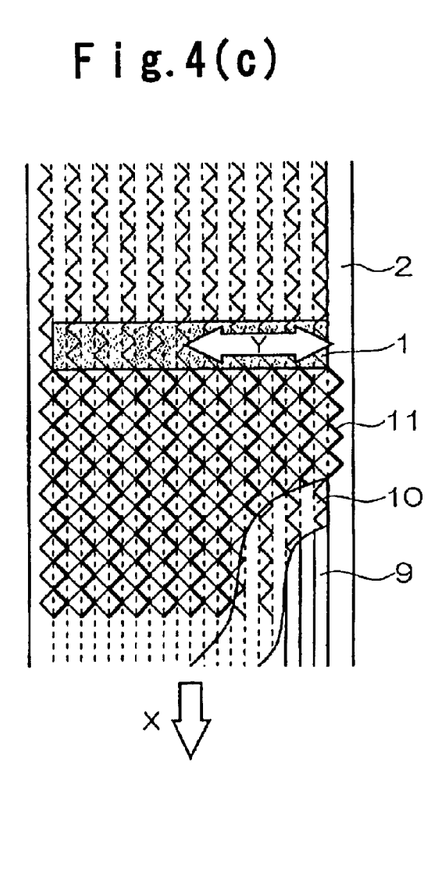

Now, the coating step of the process for producing a coating film according to the fourth embodiment of the present invention is shown in FIGS. 4(a) to 4(c).

In FIG. 4(a), a first layer 9 is coated by a coating operation in a line, and a second layer 10 is coated thereon along the broken line waveform and a third layer 11 is coated thereon along the similar broken line waveform reverse thereto as shown in FIGS. 4(a) and 4(c), whereby a coating film wherein a plurality of coating layers are laminated is formed.

In this coating film, directivity by the first layer 9 is imparted to isotropic strength properties by the second layer 10 and the third layer 11. Accordingly, by laminating a plurality of coating layers having various directions of the coating operations, a coating film having increased strength in a specific direction, in addition to secured certain isotropic strength properties in all directions, can be formed.

Figure 5:
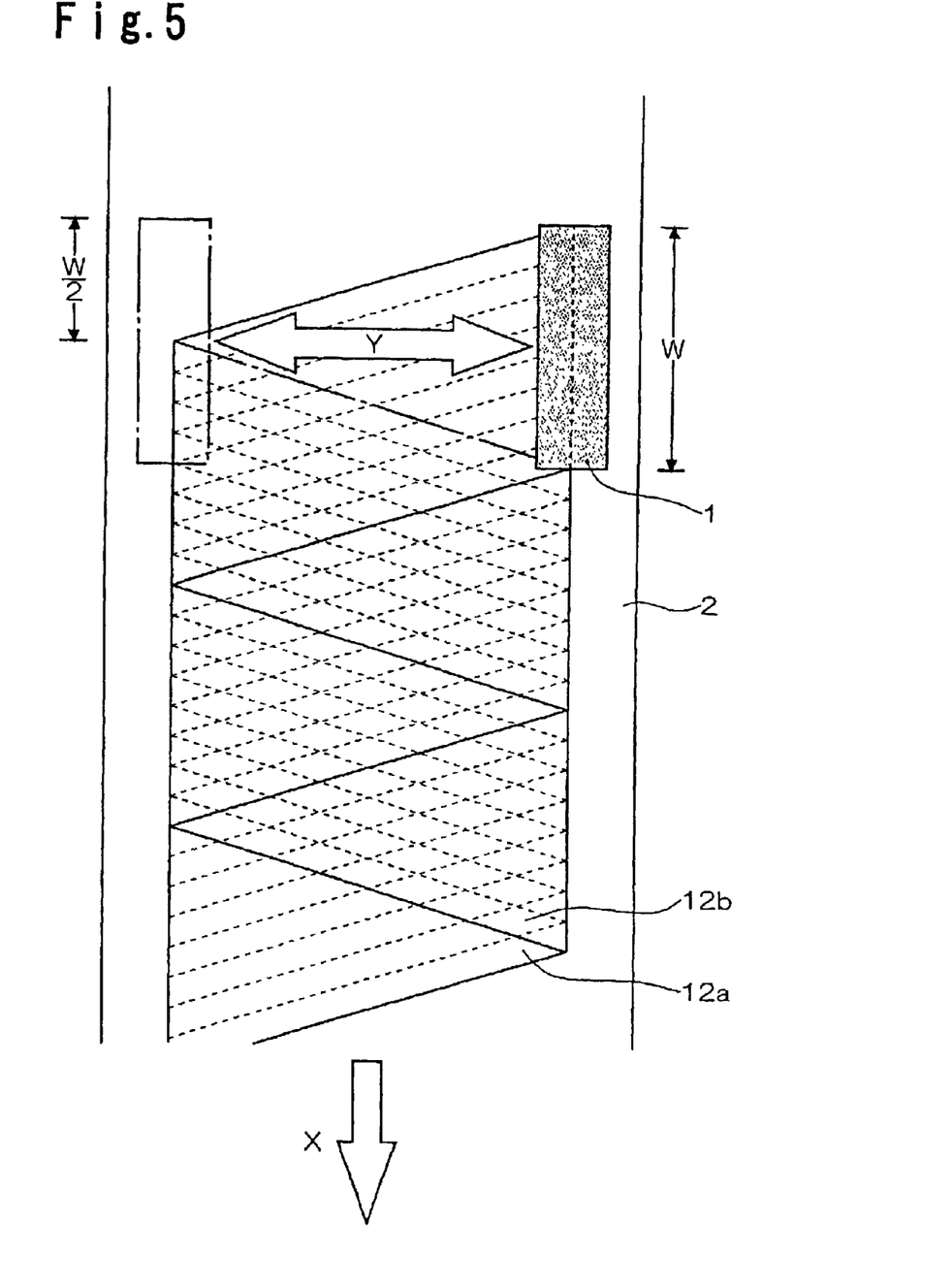
FIG. 5 is a coating process drawing illustrating the process for producing a coating film according to the fifth embodiment of the present invention.

Now, the coating step by the process for producing a coating film according to the fifth embodiment of the present invention is shown in FIG. 5.

In FIG. 5, the die 1 reciprocates in a direction Y (the die front direction) at right angles to the longitudinal direction of the linear opening (the length in the die width direction: W) while discharging a coating liquid having short fibrous fillers mixed therewith from the linear opening. The substrate 2 for coating moves toward the longitudinal direction X of the linear opening of the die 1 (die width direction).

By making the speed ratio between the die 1 and the substrate 2 for coating constant, the trail of the coating operation is a broken line in a zigzag. By this coating operation, a coating film wherein a second layer 12b after turning is superposed on a first layer 12a before turning at the turning portion in the reciprocating operation of the die 1, is formed. When the feed speed of the substrate 2 for coating is equal to the width W of the die in a cycle of the reciprocating operation, a coating film wherein adjacent superposed portions consisting of two layers are sequentially and continuously adjacent to one another is formed.

By the process for producing a coating film, a coating film consisting of a plurality of coating layers can be formed in a single step. With respect to the first layer 12a and the second layer 12b superposed one on the other, the trail of the coating operation in at least one direction crosses a cross section of the coating film in an optional direction by the coating operation along the broken line. Further, the trails of the coating operations for the two layers at the superposed portions are reversed and crossed to each other by the reciprocating operation of the die 1.

Accordingly, by the coating operation to form the first layer 12a and the second layer 12b along broken lines reverse to each other, the short fibrous fillers are crossed to one another and their reinforcing effect is given to an optional direction of the coating film, and accordingly the difference in strength properties depending upon the direction in the coating film is decreased, in the same manner as mentioned above. Here, in the case of this method, the portion coated first comprises only one layer of the coating layer 12a (the same applies to the portion coated at last), and said portion may be cut off.

Figure 6A:
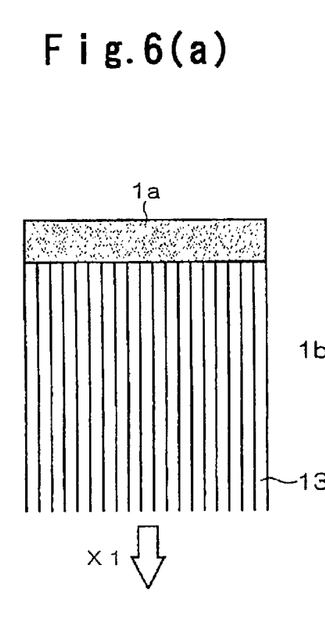
FIGS. 6(a) and 6(b) are coating process drawings illustrating the process for producing a coating film according to the sixth embodiment of the present invention.
Figure 6B:
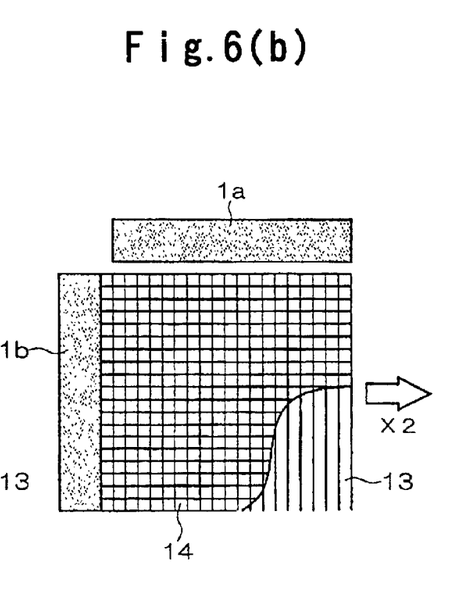

Now, the coating step of the process for producing a coating film according to the sixth embodiment of the present invention is shown in FIGS. 6(a) and 6(b).

In FIG. 6(a), a die 1a moves toward a direction X1 (die front direction) at right angles to the longitudinal direction of its linear opening, while discharging a coating liquid having short fibrous fillers blended therewith from the linear opening. On the first layer 13 thus obtained, a second layer 14 is formed by using a die 1b as shown in FIG. 6(b), disposed at right angles to the die 1a, and by moving the die 1b toward its front direction X2. The direction in the coating operation for the second layer 14 is at right angles to the direction in the coating operation for the first layer, and a coating film wherein the first layer 13 and the second layer 14 are laminated is formed.

In this process for producing a coating film, the trails of the coating operations for the two superposed layers are at right angles, and accordingly short fibrous fillers cross one another at right angles in the thickness direction of the coating film at an optional position. The reinforcing effect equally shows up in two directions at right angles, and accordingly strength properties depending upon the direction in the coating film are uniform in all directions.

In the case where a solid polymer electrolyte membrane is formed with an ion exchange resin by applying the above process to produce a solid polymer electrolyte fuel cell, by using a coating liquid containing a fluorine-containing polymer having sulfonic acid groups and short fibrous fillers, mechanical strength of the solid polymer electrolyte membrane can be improved isotropically. Accordingly, the solid polymer electrolyte membrane is excellent in strength properties even if it is made thin.

Here, a mechanism for a coating operation comprising the die 1 and the substrate 2 for coating is not limited to the reciprocating operation of the die 1 and the feeding operation of the substrate 2 for coating, and a mechanism wherein at least one of them is relatively moved, by means of e.g. so-called die coating, as illustrated in FIGS. 1 to 6, may be applied in general.

Now, the present invention will be explained in further detail with reference to Examples. However, it should be understood that the present invention is by no means restricted to such specific Examples.

With regard to Examples 1 to 3 according to the process for producing a coating film of the present invention (FIGS. 1, 5 and 6) and Comparative Example 1 by a conventional process (FIG. 8), cast film forming processes are compared and verified.

Regarding a coating film formed as a polymer electrolyte membrane 103, by using an ion exchange resin dispersion containing a fibrillated reinforcing material as a coating liquid, the resistivity and strength in MD direction (direction in which a film is formed) and TD direction (direction perpendicular to the MD direction) are measured.

Preparation of Fibril-containing Ion Exchange Resin Dispersion 9,600 g of a copolymer powder comprising polymerization units derived from tetrafluoroethylene and polymerization units derived from $CF_2=CF-OCF_2CF(CF_3)O(CF_2)_2SO_2F$ (ion exchange capacity: 1.1 meq/g dry resin, hereinafter referred to as copolymer A) and 400 g of a PTFE powder (tradename: Fluon CD-1, manufactured by Asahi Glass Company, Limited) were mixed, followed by biaxial extrusion to obtain 9,500 g of pellets. The pellets were hydrolyzed in an aqueous solution containing 30% of dimethylsulfoxide and 15% of potassium hydroxide, each based on the mass of the entire solution, immersed in a 1 mol/l hydrochloric acid at room temperature for 16 hours for conversion into an acid type (sulfonic acid groups), washed with water and dried.

The dried product was dispersed in ethanol to obtain a fibrillated fluorocarbon polymer-containing ion exchange resin dispersion containing a fibrillated fluorocarbon polymer (4.0% based on the entire mass of the solid content) and a perfluorocarbon polymer containing sulfonic acid groups, having a solid content of 10% based on the mass of the entire solution.

Method of Measuring Tear Strength

Stripe samples with a width of 5 cm and a length of 15 cm, wherein the longitudinal direction was MD direction (movement direction of the substrate) and samples with the same size wherein the longitudinal direction was the TD direction (direction perpendicular to the movement direction of the substrate) were cut from the polymer electrolyte membrane. Each sample was scored by 7.5 cm which is half the length of 15 cm from the center of the short side so that the sample is halved along the length direction. One edge at the scored portion was fixed on the upper chuck of a tensile tester and the other end was fixed on the lower chuck so that the sample was torn at the scored portion, and the space between the chucks was enlarged at a rate of 200 mm/min at 25° C., to measure the tear load. The tear strength was obtained by dividing the tear load by the thickness of the sample, as an average of five samples.

Method of Measuring Resistivity of Polymer Electrolyte Membrane

From the fibril-containing polymer electrolyte membrane 103, a stripe membrane sample with a width of 5 mm was prepared, five platinum wires (diameter: 0.2 mm) were imposed on the surface so that they were in parallel with the width direction with an interval of 5 mm, the sample was held in a constant temperature and humidity apparatus of 80° C. with a relative humidity of 95%, and an alternating current impedance between the platinum wires at an alternating current of 10 kHz was measured to obtain the alternating current resistivity. As five platinum wires were imposed with an interval of 5 mm, the distance between electrodes can be changed to 5, 10, 15 or 20 mm, and accordingly the alternating current resistance at each distance between electrodes was measured, and the resistivity of the membrane was calculated from the distance between electrodes and the gradient of the resistance to exclude effect of the contact resistance between the platinum wire and the membrane. A linear relation between the distance between electrodes and the measured resistance was obtained, and the resistivity was calculated from the gradient and the thickness in accordance with the following formula:

Resistivity ρ (Ω·cm)=sample width (cm)×sample thickness (cm)× gradient of the resistance between electrodes (Ω/cm)

EXAMPLE 1

The fibrillated fluorocarbon polymer-containing ion exchange resin dispersion obtained by the above-described preparation was coated on a polyethylene terephthalate (PET) film surface-treated with a silicone type releasing agent by means of a die coating process (the first embodiment) as shown in FIGS. 1(a) and 1(b), to form a polymer electrolyte membrane 103 containing 4.0 mass % of a reinforcing material comprising a fibrillated fluorocarbon polymer, having a thickness of 30 μm, consisting of two coating layers with a thickness of 15 μm.

The resistivity of the polymer electrolyte membrane 103 was 4 Ω·cm. The tear strengths in the MD direction and the TD direction of the fibril-containing polymer electrolyte membrane 103 were 4 N/mm and 5 N/mm, respectively.

EXAMPLE 2

Using the fibrillated fluorocarbon polymer-containing ion exchange resin dispersion in the same manner as in Example 1, a polymer electrolyte membrane 103 having a thickness of 30 μm was formed by means of a die coating process as shown in FIG. 5 (the fifth embodiment) by which anisotropy can be decreased with a single coating. The feed speed of the substrate 2 for coating was made to be equal to the width W of the die in the cycle of the reciprocating operation. Of the obtained polymer electrolyte membrane 103, the resistivity and the tear strengths were measured in the same manner as in Example 1, whereupon the resistivity was 4 Ω·cm, and the tear strengths in the MD direction and the TD direction were 4 N/mm and 5 N/mm, respectively.

EXAMPLE 3

Using the fibrillated fluorocarbon polymer-containing ion exchange resin dispersion in the same manner as in Example 1, a polymer electrolyte membrane 103 having a thickness of 30 μm, consisting of two coating layers with a thickness of 15 μm, was formed by means of a die coating process as shown in FIGS. 6(a) and 6(b) (the sixth embodiment) by which anisotropy can be made as small as possible. Of the obtained polymer electrolyte membrane 103, the resistivity and the tear strengths were measured in the same manner as in Example 1, whereupon the resistivity was 4 Ω·cm, and the tear strengths in the MD direction and the TD direction were 5 N/mm and 5 N/mm, respectively.

COMPARATIVE EXAMPLE 1

In the same manner as in Example 2, the fibrillated fluorocarbon polymer-containing ion exchange resin dispersion was coated on a polyethylene terephthalate (PET) film surface-treated with a silicone type releasing agent as a substrate 2 for coating, by fixing the direction of the die 1 at right angles to the moving direction of the substrate 2 for coating and moving only the substrate 2 for coating, to form a polymer electrolyte membrane 103 having a thickness of 30 μm and containing 4.0 mass % of a reinforcing material comprising a fibrillated fluorocarbon polymer. Of the obtained polymer electrolyte membrane 103, the resistivity and the tear strengths were measured in the same manner as in Example 1, whereupon the resistivity was 4 Ω·cm, and the tear strengths in the MD direction and the TD direction were 2 N/mm and 8 N/mm, respectively.

According to the above measurement results, it was verified that by the process for producing a coating film of the present invention, the difference in strength depending upon the direction in the coating film is decreased, under preparation conditions in which the resistivities are substantially the same as the polymer electrolyte membrane 103.

According to the process for producing a coating film of the present invention, by controlling the orientation direction of short fibrous fillers by means of control of the coating operation in cast film forming, a coating film consisting of a coating layer or a plurality of coating layers laminated one on another, with small anisotropy and with a small difference in tensile strength as between in the TD and MD directions, can be produced.

Accordingly, by applying the coating film obtained by the production process of the present invention to a polymer electrolyte membrane for solid polymer electrolyte fuel cells, the strong anisotropy of the polymer electrolyte membrane can be controlled, and the polymer electrolyte membrane can be made to have a high strength isotropically. Therefore, the polymer electrolyte membrane can be made thin, and as a result, the electric resistance can be decreased, and a solid polymer electrolyte fuel cell having high performances can be obtained.

The entire disclosure of Japanese Patent Application No. 2001-293337 filed on Sep. 26, 2001 including specification, claims, drawings and summary is incorporated herein by reference in its entirety.

What is claimed is:

1. A process for producing a coating film consisting of a single coating layer or a plurality of coating layers laminated, which comprises a coating operation of relatively moving at least one of a die for discharging a coating liquid containing short fibrous fillers from a linear opening with a predetermined length and a substrate for coating, on which the coating liquid discharged from the die is coated, to form a coating layer on the substrate for coating, wherein the direction in the coating operation includes at least two different angle directions with regard to the single coating layer or the plurality of coating layers of the coating film.

2. The process for producing a coating film according to claim 1, wherein the short fibrous fillers comprise a fibrillated fluorocarbon polymer.

3. The process for producing a coating film according to claim 1, wherein the coating operation is a composite operation comprising a feeding operation in one direction along one line and a reciprocating operation in a direction at right angles to the line of the feeding operation.

4. The process for producing a coating film according to claim 3, wherein the direction in the feeding operation is a direction at right angles to the longitudinal direction of the linear opening of the die, and the direction in the reciprocating operation is the longitudinal direction of the linear opening of the die.

5. The process for producing a coating film according to claim 3, wherein the direction in the feeding operation is the longitudinal direction of the linear opening of the die, and the direction in the reciprocating operation is a direction at right angles to the longitudinal direction of the linear opening of the die.

6. The process for producing a coating film according to claim 3, wherein the short fibrous fillers comprise a fibrillated fluorocarbon polymer.

7. The process for producing a coating film according to claim 1, wherein the coating film has at least two coating layers, in any two coating layers, each of the directions in the coating operations for forming the upper side coating layer and the lower side coating layer is at right angles to the longitudinal direction of the linear opening of the die, and after formation of the lower side coating layer, the direction of at least one of the die and the substrate for coating is changed to form the upper side coating layer so that the directions of the coating operations for the lower side coating layer and the upper side coating layer are at right angles to each other.

8. The process for producing a coating film according to claim 7, wherein the short fibrous fillers comprise a fibrillated fluorocarbon polymer.

9. A process for producing an electrolyte membrane for solid polymer electrolyte fuel cells comprising a reinforced ion exchange membrane, which comprises forming a coating layer on a substrate for coating by a coating operation of relatively moving at least one of a die for discharging a coating liquid containing short fibrous fillers and an ion exchange resin from a linear opening with a predetermined length and the substrate for coating, on which the coating liquid discharged from the die is coated, to form an ion exchange membrane consisting of a single coating layer or a plurality of coating layers laminated, wherein the direction in the coating operation includes at least two different angle directions with regard to the single coating layer or the plurality of coating layers of the ion exchange membrane.

10. The process for producing an electrolyte membrane for solid polymer electrolyte fuel cells according to claim 9, wherein the short fibrous fillers comprise a fibrillated fluorocarbon polymer.

11. The process for producing an electrolyte membrane for solid polymer electrolyte fuel cells according to claim 9, wherein the coating operation is a composite operation consisting of a feeding operation in one direction along one line and a reciprocating operation in a direction at right angles to the line of the feeding operation.

12. The process for producing an electrolyte membrane for solid polymer electrolyte fuel cells according to claim 11, wherein the direction in the feeding operation is a direction at right angles to the longitudinal direction of the linear opening of the die, and the direction in the reciprocating operation is the longitudinal direction of the linear opening of the die.

13. The process for producing an electrolyte membrane for solid polymer electrolyte fuel cells according to claim 11, wherein the direction in the feeding operation is the longitudinal direction of the linear opening of the die, and the direction in the reciprocating operation is a direction at right angles to the longitudinal direction of the linear opening of the die.

14. The process for producing an electrolyte membrane for solid polymer electrolyte fuel cells according to claim 11, wherein the short fibrous fillers comprise a fibrillated fluorocarbon polymer.

15. The process for producing an electrolyte membrane for solid polymer electrolyte fuel cells according to claim 11, wherein the ion exchange membrane has at least two coating layers, in any two coating layers, each of the directions in the coating operations for forming the upper side coating layer and the lower side coating layer is at right angles to the longitudinal direction of the linear opening of the die, and after formation of the lower side coating layer, the direction of at least one of the die and the substrate for coating is changed to form the upper side coating layer so that the directions of the coating operations for the lower side coating layer and the upper side coating layer are at right angles to each other.

16. The process for producing an electrolyte membrane for solid polymer electrolyte fuel cells according to claim 15, wherein the short fibrous fillers comprise a fibrillated fluorocarbon polymer.

17. A process for producing a solid polymer electrolyte fuel cell comprising a polymer electrolyte membrane, and an anode and a cathode facing each other with the polymer electrolyte membrane interposed therebetween, which comprises forming a coating layer on a substrate for coating by a coating operation of relatively moving at least one of a die for discharging a coating liquid containing short fibrous fillers and an ion exchange resin from a linear opening with a predetermined length and the substrate for coating, on which the coating liquid discharged from the die is coated, to form an ion exchange membrane consisting of a single coating layer or a plurality of coating layers laminated, and disposing the ion exchange membrane as a polymer electrolyte membrane between an anode and a cathode, wherein the direction in the coating operation includes at least two different angle directions with regard to the single coating layer or the plurality of coating layers of the ion exchange membrane.

18. The process for producing a solid polymer electrolyte fuel cell according to claim 17, wherein the short fibrous fillers comprise a fibrillated fluorocarbon polymer.

19. The process for producing a solid polymer electrolyte fuel cell according to claim 17, wherein the coating operation is a composite operation consisting of a feeding operation in one direction along one line and a reciprocating operation in a direction at right angles to the line of the feeding operation.

20. The process for producing a solid polymer electrolyte fuel cell according to claim 19, wherein the direction in the feeding operation is a direction at right angles to the longitudinal direction of the linear opening of the die, and the direction in the reciprocating operation is the longitudinal direction of the linear opening of the die.

21. The process for producing a solid polymer electrolyte fuel cell according to claim 19, wherein the direction in the feeding operation is the longitudinal direction of the linear opening of the die, and the direction in the reciprocating operation is a direction at right angles to the longitudinal direction of the linear opening of the die.

22. The process for producing a solid polymer electrolyte fuel cell according to claim 19, wherein the short fibrous fillers comprise a fibrillated fluorocarbon polymer.

23. The process for producing a solid polymer electrolyte fuel cell according to claim 17, wherein the ion exchange membrane has at least two coating layers, in any two coating layers, each of the directions in the coating operations for forming the upper side coating layer and the lower side coating layer is at right angles to the longitudinal direction of the linear opening of the die, and after formation of the lower side coating layer, the direction of at least one of the die and the substrate for coating is changed to form the upper side coating layer so that the directions of the coating operations for the lower side coating layer and the upper side coating layer are at right angles to each other.

24. The process for producing a solid polymer electrolyte fuel cell according to claim 23, wherein the short fibrous fillers comprise a fibrillated fluorocarbon polymer.

* * * * *